G. JENDRAS.
BREAD CUTTING MACHINE.
APPLICATION FILED FEB. 24, 1908.

932,555.

Patented Aug. 31, 1909.
2 SHEETS—SHEET 1.

Witnesses

Inventor
Gottlieb Jendras.
by H. B. Willson & Co
Attorneys

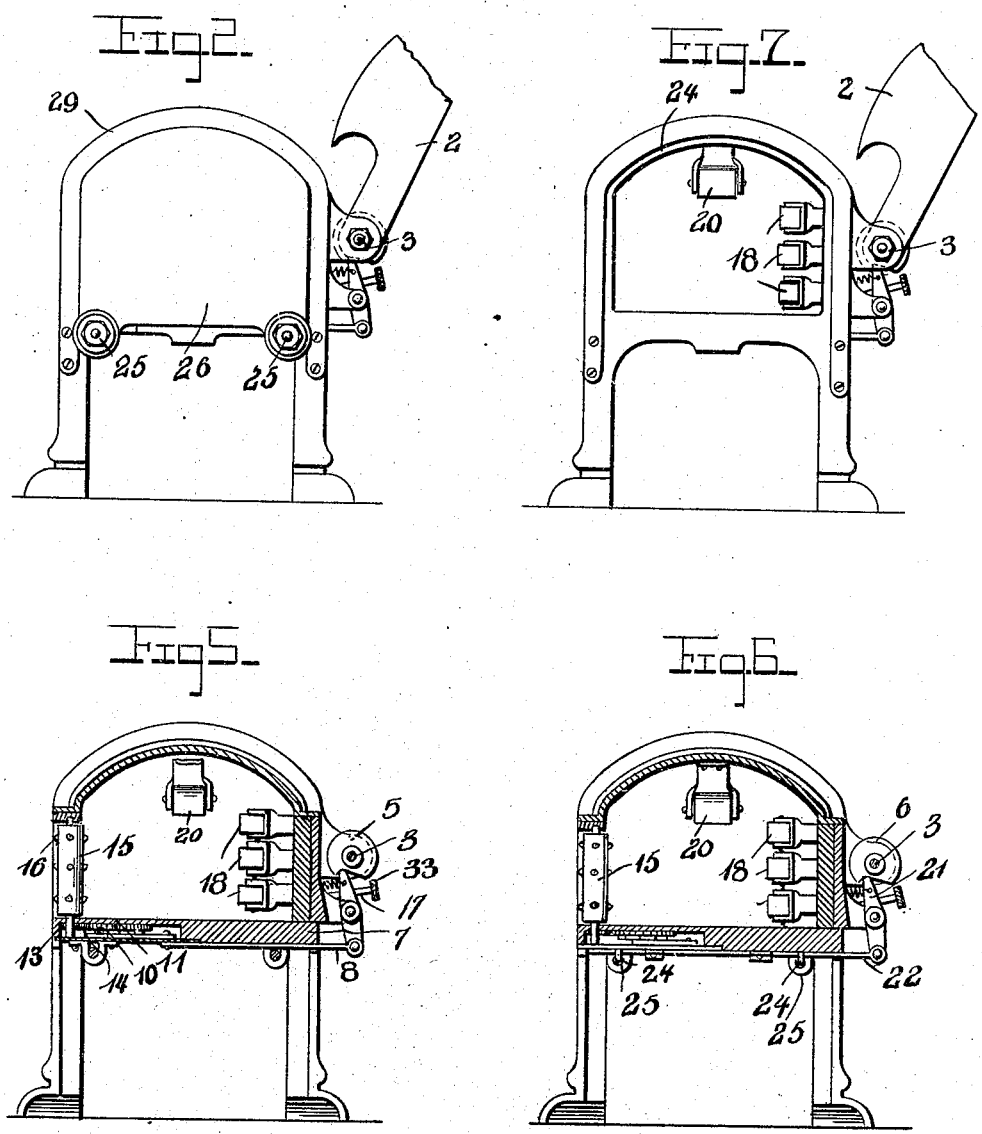

UNITED STATES PATENT OFFICE.

GOTTLIEB JENDRAS, OF POSEN, GERMANY.

BREAD-CUTTING MACHINE.

932,555.  Specification of Letters Patent.  Patented Aug. 31, 1909.

Application filed February 24, 1908. Serial No. 417,491.

*To all whom it may concern:*

Be it known that I, GOTTLIEB JENDRAS, a subject of the Emperor of Germany, residing at 8 Greurstrasse, Posen, Germany, have invented certain new and useful Improvements in Bread-Cutting Machines; and I do hereby declare the following to be a full, clear, and exact description of the invention, such as will enable others skilled in the art to which it appertains to make and use the same.

This invention relates to a bread cutting machine in which the bread is fed forward automatically by the movement of the cutter. The present device differs from known bread cutting machines of this kind in that during the downward movement of the cutter a closing cover arranged on the cutting side of the bread holder is moved away from such holder or receptacle simultaneously with the feed device for the bread, by suitable gear arranged on the cutter shaft and, after the cutter has swung out, returns to its position automatically. In consequence of this the receptacle for the bread is only opened when the cutter effects a cutting movement whereby a too rapid drying of the bread is reliably prevented.

Figure 1:
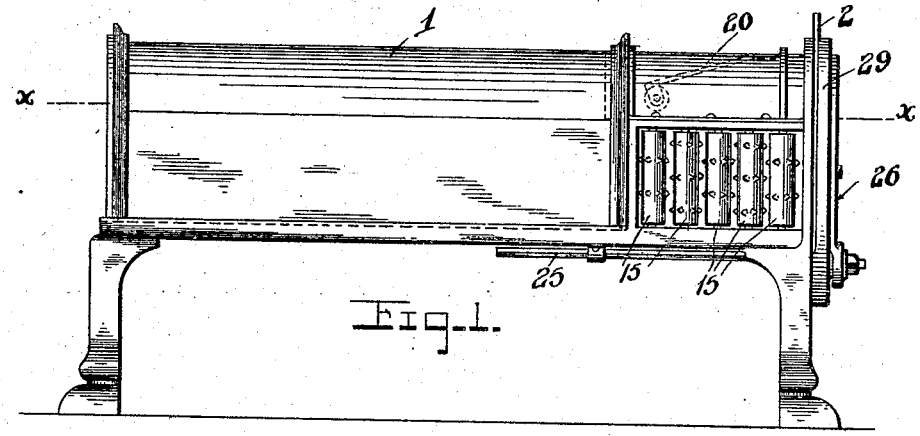
Figure 3:
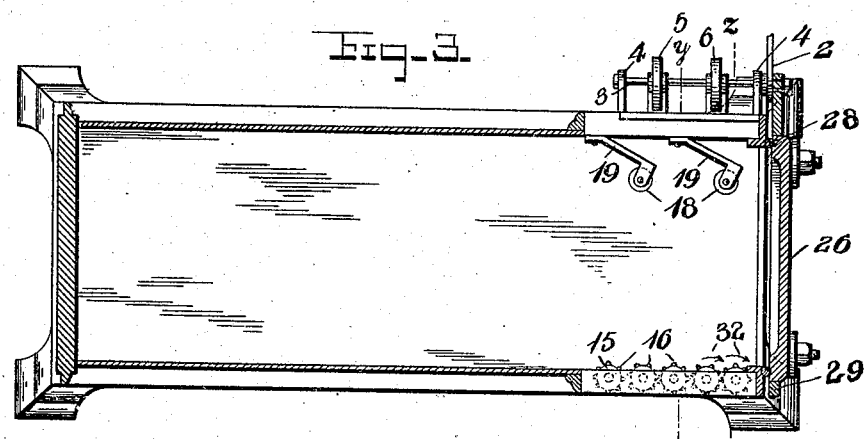
Figure 4:
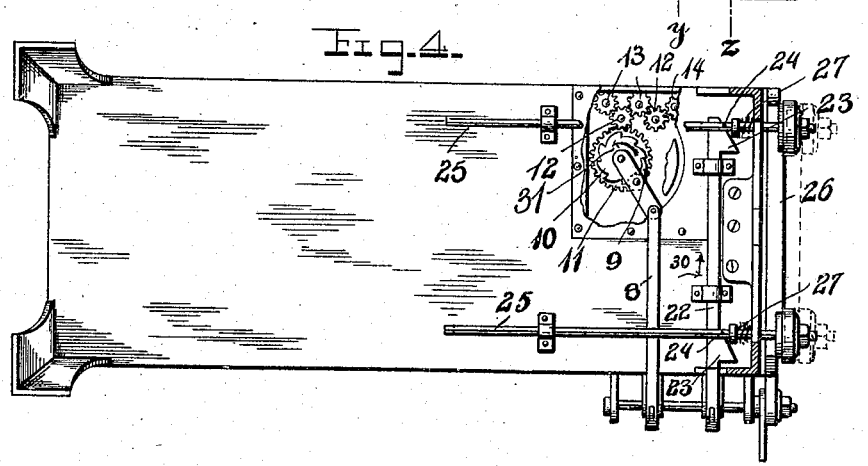

The bread cutting machine is illustrated in the drawing. Figure 1 being a side elevation of the machine, Fig. 2 a front elevation of the same, Fig. 3 is a section through $x$—$x$ in Fig. 1 of the front portion of the machine, Fig. 4 is an inverted plan of the front portion of the machine, Fig. 5 is a section through $y$ $y$ in Fig. 3, Fig. 6 a section through $z$ $z$ in Fig. 3, Fig. 7 is a front elevation of the machine with the closing cover removed.

1 is the receptacle for the bread. The cutter 2 is fixed on the shaft 3, which is mounted to rotate in the bearings 4 4. The cutting edge of the cutter 2 is not straight but forms in the known manner two curves which terminate in a point so that this point which easily cuts through the crust of the bread first enters the bread and the curved pieces effect the further separation of the slice from the bread.

On the shaft 3 two cam disks 5 and 6 are arranged. The cam 5 actuates the feed rollers and the cam 6 the front closing cover of the machine. One end of a lever 7 Fig. 5 bears against the cam 5 while the other end of the lever 7 is connected through the slide rod 8 (Fig. 4) with a link which carries the pawl 9, that engages in a ratchet wheel 10. The wheel 10 is fixed to a toothed gear wheel 11 which acts on the gear wheels 12, 12 and 13, 13. The gear wheels 13 are mounted on the shafts 14 of the feed rollers 15 (Figs. 1, 3, 5, 6) while the gear wheels 12 are arranged between the gear wheel 13, in order that when the wheel 11 rotates they may rotate the feed rollers 15 in the same direction. The feed rollers 15 are furnished with teeth 16 which engage slightly in the bread and thereby insure a uniform feed movement thereof. On the lever 7 an adjusting screw 17 is arranged (Fig. 5), by means of which the stroke of the lever 7 and thereby the feed movement of the bread can be adjusted as desired. If the free end of the lever 7 be moved away from the nose 33 of the cam by suitably turning the screw 17 so that this nose 33 only engages and actuates the lever 7 during a part of the movement of the cutter 2, a shorter movement of the pawl 9 and thereby also a shorter rotary movement of the ratchet wheel 10 of the toothed wheel 11 and the feed rollers 15 is effected.

In the receptacle opposite the feed rollers, guide rollers 18 (Figs. 3, 5, 6, 7) are arranged which are attached to spring arms 19 and keep the bread always firmly held against the feed rollers 15. It is desirable, in the front part of the receptacle 1, to arrange such a spring roller 20 from above also (Figs. 1, 5, 6, 7) which presses against the bread, so that the narrow end of the bread may also be guided in a correct position in front of the cutter.

The second cam 6 arranged on the shaft 3 acts on a lever 21 (Fig. 6) which is connected with a slide rod 22 (Figs. 4 and 6) which is furnished with projections or noses 23. These projections 23 lie against extensions 24 of guide bolts 25 on which the front closing cover 26 of the bread receptacle is fixed. Springs 27 on the bolts 25 have a tendency to press the closing cover firmly against the front wall of the receptacle. To insure tight closing a packing 28 (Fig. 3) made of india rubber is fixed on the inside of the cover. For insuring the proper guiding of the cutter 2 a frame 29 is further provided on the front wall of the receptacle (Figs. 1, 2, 3 and 7). This frame prevents the cutter from swinging away from the front wall of the receptacle.

The action of the machine is as follows:—
The bread is pushed into the receptacle 1, so that it comes in front against the closing plate 26 in connection wherewith the spring rollers 18 hold the bread against the feed rollers 15 and the spring rollers hold it against the lower plate. If the cutter is moved downward the cam disks 5 and 6 push their respective levers 7 and 21 aside during the early part of the movement of the cutter 2 before the cutter enters the bread. The lever 21 moves the slide rod 22 in the direction of the arrow 30 (Fig. 4), causing the oblique surfaces of the projections 23 to push the guide bolts 25 to the right overcoming the power of the springs 27 and press the closing plate 26 away from the front of the bread receptacle. At the same time however the pawl 9 (Fig. 4) is pressed forward by the lever 7 through the medium of the slide rod 8 and rotates the toothed wheel 11 in the direction of the arrow 31 whereby through the medium of the toothed wheels 12 and 13 the feed rollers are moved in the direction of the arrows 32 and push the bread correspondingly to the adjustment of the adjusting screw 17 out of the front of the bread receptacle to the extent of the thickness of the slice of bread to be cut off. As the cutter 2 moves farther downward the point thereof cuts through the crust of the bread, whereupon the slice of bread is easily cut off, and falls out and drops. When the cutter is returned to its starting position, (it being a reciprocating cutter) the levers 7 and 21 also return to their starting positions under spring action. The lever 7 with the slide rod 8 runs idly, because the pawl 9 slips over the teeth of the ratchet wheel 10 without actuating that wheel. The guide bolts 25 for the closing plates on the other hand return to their starting position under the action of the springs 27, as soon as their extensions 24 are released from the projections 23, so that the closing cover 26 with its packing layer 28 again effects a tight shutting of the bread receptacle.

What I claim and desire to secure by Letters Patent is:—

In a bread cutting device, the combination of a main support, an inclosed casing mounted thereon, a rotary shaft mounted adjacent one end of said casing, a cutter secured to said shaft and adapted to move past the end of said casing, feed rollers mounted in said casing, a cam mounted on said shaft, a pawl and ratchet device for actuating said rollers, operated by said cam, a plate normally covering the cutting end of said casing, rods secured to said plate and extending loosely through brackets mounted upon the main support, springs mounted on said rods and engaging the casing to normally hold said plate against the end of the casing, projections on said rods, a second cam mounted on said shaft, a slide bar mounted in said main support and provided with cam surfaces adapted to engage the projections on said rods to move said plate away from said casing at the beginning of the downward stroke of the cutter.

In testimony whereof I affix my signature, in presence of two witnesses.

GOTTLIEB JENDRAS.

Witnesses:
BRUNO HOULINY,
SVEN A. VIETZ.